(12) United States Patent
Zhou et al.

(10) Patent No.: US 12,713,264 B2
(45) Date of Patent: Aug. 18, 2026

(54) JOINT CELL ACTIVATION AND TIMING ADVANCE COMMAND

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 420 days.

(21) Appl. No.: 18/352,105

(22) Filed: Jul. 13, 2023

(65) Prior Publication Data

US 2024/0080698 A1 Mar. 7, 2024

Related U.S. Application Data

(60) Provisional application No. 63/374,829, filed on Sep. 7, 2022.

(51) Int. Cl.
*H04W 24/10* (2009.01)
*H04W 56/00* (2009.01)
*H04W 72/231* (2023.01)

(52) U.S. Cl.
CPC ....... *H04W 24/10* (2013.01); *H04W 56/0045* (2013.01); *H04W 72/231* (2023.01)

(58) Field of Classification Search
None
See application file for complete search history.

(56) References Cited

U.S. PATENT DOCUMENTS

| | | | |
|---|---|---|---|
| 2013/0114576 A1 | 5/2013 | Kwon et al. |
| 2021/0352750 A1 | 11/2021 | Cheng et al. |
| 2022/0007314 A1 | 1/2022 | Damnjanovic et al. |
| 2022/0022067 A1 | 1/2022 | Kim et al. |
| 2022/0030503 A1 | 1/2022 | Dinan |

OTHER PUBLICATIONS

International Search Report and Written Opinion—PCT/US2023/070325—ISA/EPO—Nov. 8, 2023.

*Primary Examiner* — Willie J Daniel, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive, from a primary cell (PCell), a radio resource control (RRC) message that indicates an inter-cell mobility cell set and a measurement configuration. The UE may transmit, to the PCell, a measurement report that indicates one or more measurements of one or more cells indicated in the inter-cell mobility cell set, wherein the one or more measurements are derived based at least in part on the measurement configuration. The UE may receive, from the PCell, a joint cell activation and timing advance command medium access control control element (MAC-CE), wherein the joint cell activation and timing advance command MAC-CE indicates an activation of a new cell, of the one or more cells, and timing advance information associated with the new cell. Numerous other aspects are described.

30 Claims, 13 Drawing Sheets

100
Communication Manager 140
Communication Manager 150
Macro Cell
Aggregated Architecture
Disaggregated Architecture
NN
Network node(s) (NNs)
110a
110b
110c
110d
Relay NN
102a
102b
102c
UE
120a
120b
120c
120d
120e
130
Network controller
to/from NNs

500

700

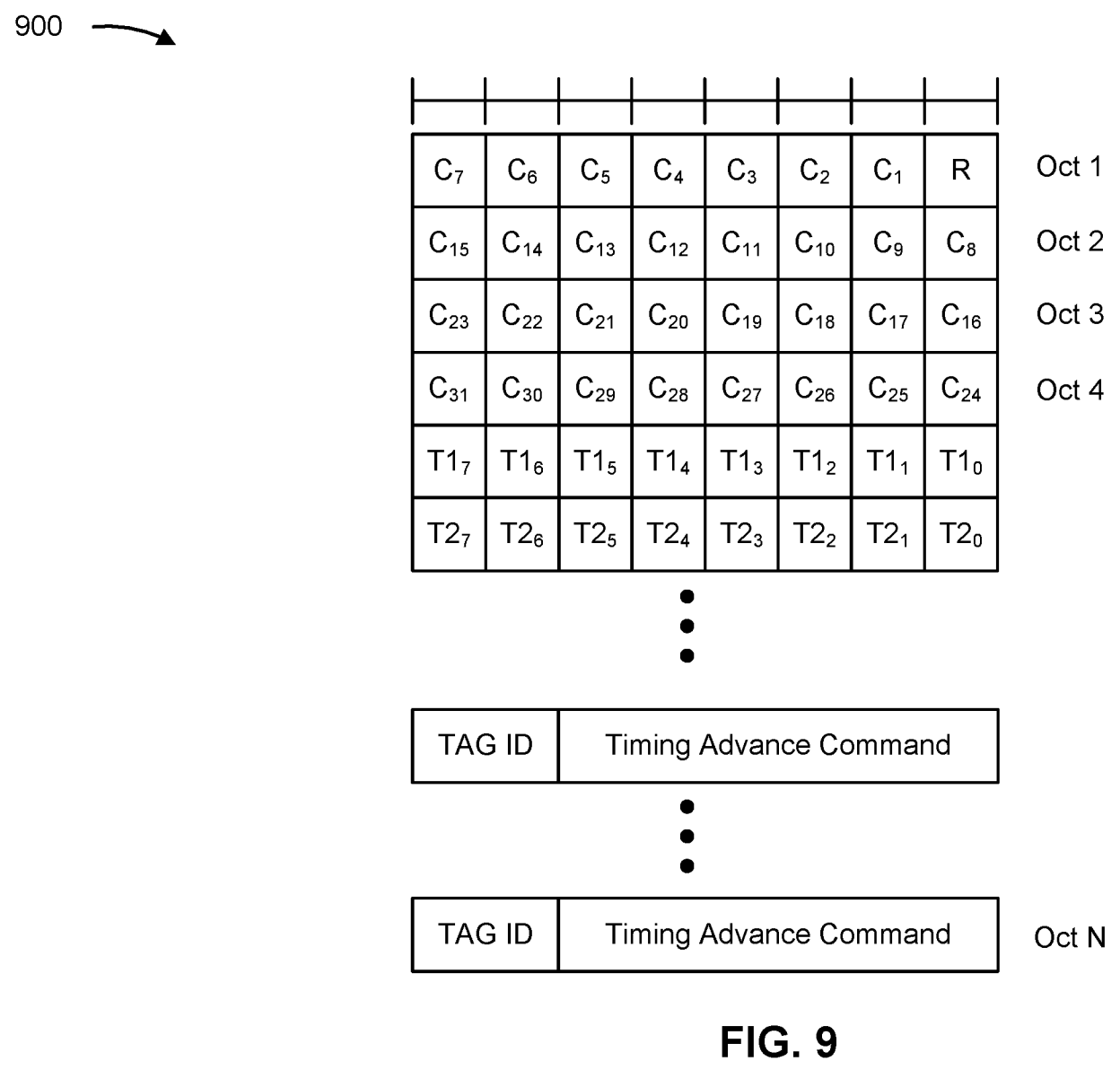

900

| | | | | | | | | |
|---|---|---|---|---|---|---|---|---|
| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
| $T1_7$ | $T1_6$ | $T1_5$ | $T1_4$ | $T1_3$ | $T1_2$ | $T1_1$ | $T1_0$ | |
| $T2_7$ | $T2_6$ | $T2_5$ | $T2_4$ | $T2_3$ | $T2_2$ | $T2_1$ | $T2_0$ | |

•••

| TAG ID | Timing Advance Command | |
|---|---|---|

•••

| TAG ID | Timing Advance Command | Oct N |
|---|---|---|

FIG. 9

JOINT CELL ACTIVATION AND TIMING ADVANCE COMMAND

CROSS-REFERENCE TO RELATED APPLICATION

This patent application claims priority to U.S. Provisional Patent Application No. 63/374,829, filed on Sep. 7, 2022, entitled "JOINT CELL ACTIVATION AND TIMING ADVANCE COMMAND," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a joint cell activation and timing advance command.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories; and one or more processors coupled to the one or more memories, the one or more processors individually or collectively configured to: receive, from a primary cell (PCell), a radio resource control (RRC) message that indicates a cell set and a measurement configuration; transmit, to the PCell, a measurement report that indicates one or more measurements of one or more cells indicated in the cell set, wherein the one or more measurements are derived based at least in part on the measurement configuration; and receive, from the PCell, a joint cell activation and timing advance command medium access control control element (MAC-CE), wherein the joint cell activation and timing advance command MAC-CE indicates an activation of a new cell, of the one or more cells, and timing advance information associated with the new cell.

In some implementations, an apparatus for wireless communication at a network node includes one or more memories; and one or more processors coupled to the one or more memories, the one or more processors individually or collectively configured to: transmit, to a UE and via a PCell of the network node, an RRC message that indicates a cell set and a measurement configuration; receive, from the UE, a measurement report that indicates one or more measurements of one or more cells indicated in the cell set, wherein the one or more measurements are derived based at least in part on the measurement configuration; and transmit, to the UE and via the PCell, a joint cell activation and timing advance command MAC-CE, wherein the joint cell activation and timing advance command MAC-CE indicates an activation of a new cell, of the one or more cells, and timing advance information associated with the new cell.

In some implementations, a method of wireless communication performed by an apparatus of a UE includes receiving, from a PCell, an RRC message that indicates a cell set and a measurement configuration; transmitting, to the PCell, a measurement report that indicates one or more measurements of one or more cells indicated in the cell set, wherein the one or more measurements are derived based at least in part on the measurement configuration; and receiving, from the PCell, a joint cell activation and timing advance command MAC-CE, wherein the joint cell activation and timing advance command MAC-CE indicates an activation of a new cell, of the one or more cells, and timing advance information associated with the new cell.

In some implementations, a method of wireless communication performed by an apparatus of a network node includes transmitting, to a UE and via a PCell of the network node, an RRC message that indicates a cell set and a measurement configuration; receiving, from the UE, a measurement report that indicates one or more measurements of one or more cells indicated in the cell set, wherein the one or more measurements are derived based at least in part on the measurement configuration; and transmitting, to the UE and via the PCell, a joint cell activation and timing advance command MAC-CE, wherein the joint cell activation and timing advance command MAC-CE indicates an activation of a new cell, of the one or more cells, and timing advance information associated with the new cell.

In some implementations, a non-transitory computer-readable medium storing a set of instructions for wireless communication includes one or more instructions that, when executed by one or more processors of a UE, cause the UE to: receive, from a PCell, an RRC message that indicates a cell set and a measurement configuration; transmit, to the PCell, a measurement report that indicates one or more measurements of one or more cells indicated in the cell set, wherein the one or more measurements are derived based at least in part on the measurement configuration; and receive, from the PCell, a joint cell activation and timing advance command MAC-CE, wherein the joint cell activation and timing advance command MAC-CE indicates an activation of a new cell, of the one or more cells, and timing advance information associated with the new cell.

In some implementations, a non-transitory computer-readable medium storing a set of instructions for wireless communication includes one or more instructions that, when executed by one or more processors of a network node, cause the network node to: transmit, to a UE and via a PCell of the network node, an RRC message that indicates a cell set and a measurement configuration; receive, from the UE, a measurement report that indicates one or more measurements of one or more cells indicated in the cell set, wherein the one or more measurements are derived based at least in part on the measurement configuration; and transmit, to the UE and via the PCell, a joint cell activation and timing advance command MAC-CE, wherein the joint cell activation and timing advance command MAC-CE indicates an activation of a new cell, of the one or more cells, and timing advance information associated with the new cell.

In some implementations, an apparatus for wireless communication includes means for receiving, from a PCell, an RRC message that indicates a cell set and a measurement configuration; means for transmitting, to the PCell, a measurement report that indicates one or more measurements of one or more cells indicated in the cell set, wherein the one or more measurements are derived based at least in part on the measurement configuration; and means for receiving, from the PCell, a joint cell activation and timing advance command MAC-CE, wherein the joint cell activation and timing advance command MAC-CE indicates an activation of a new cell, of the one or more cells, and timing advance information associated with the new cell.

In some implementations, an apparatus for wireless communication includes means for transmitting, to a UE and via a PCell of the apparatus, an RRC message that indicates a cell set and a measurement configuration; means for receiving, from the UE, a measurement report that indicates one or more measurements of one or more cells indicated in the cell set, wherein the one or more measurements are derived based at least in part on the measurement configuration; and means for transmitting, to the UE and via the PCell, a joint cell activation and timing advance command MAC-CE, wherein the joint cell activation and timing advance command MAC-CE indicates an activation of a new cell, of the one or more cells, and timing advance information associated with the new cell.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-9 are diagrams illustrating examples associated with a joint cell activation and timing advance command, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
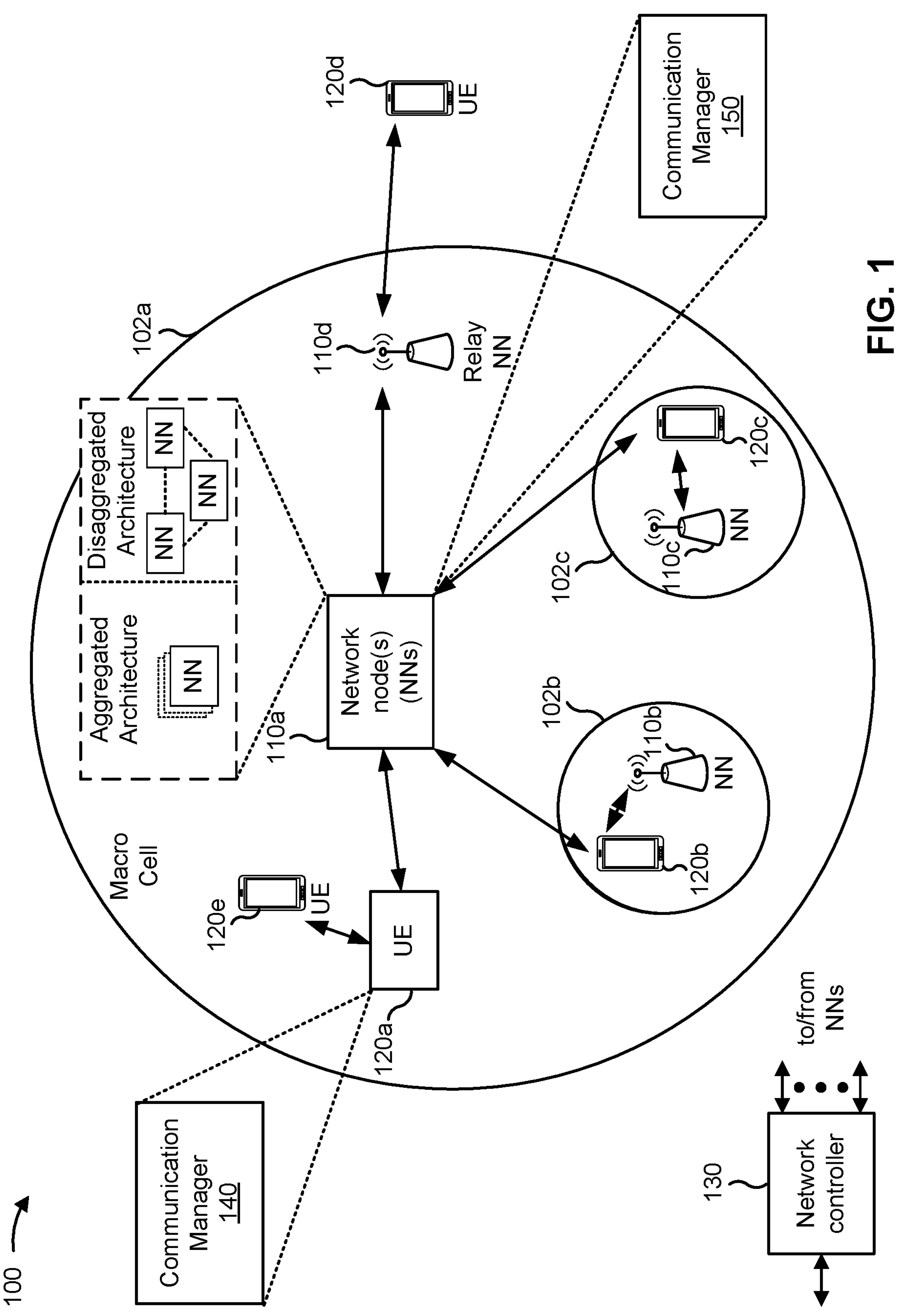
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a primary cell (PCell), a radio resource control (RRC) message that indicates a cell set and a measurement configuration; transmit, to the PCell, a measurement report that indicates one or more measurements of one or more cells indicated in the cell set, wherein the one or more measurements are derived based at least in part on the measurement configuration, wherein the cell set may include one or more cells which are candidate cells for inter-cell mobility, and wherein the inter-cell mobility corresponds to a serving cell change; and receive, from the PCell, a joint cell activation and timing advance command medium access control control element (MAC-CE), wherein the joint cell activation and timing advance command MAC-CE indicates an activation of a new cell, of the one or more cells, and timing advance information associated with the new cell. Additionally, or alternatively, the communication manager 140 may perform one or more other operations described herein.

In some aspects, a network node (e.g., network node 120) may include a communication manager 150. As described in more detail elsewhere herein, the communication manager 150 may transmit, to a UE and via a PCell of the network node, an RRC message that indicates a cell set and a measurement configuration; receive, from the UE, a measurement report that indicates one or more measurements of one or more cells indicated in the cell set, wherein the one or more measurements are derived based at least in part on the measurement configuration; and transmit, to the UE and via the PCell, a joint cell activation and timing advance command MAC-CE, wherein the joint cell activation and timing advance command MAC-CE indicates an activation of a new cell, of the one or more cells, and timing advance information associated with the new cell. Additionally, or alternatively, the communication manager 150 may perform one or more other operations described herein.

As indicated above, FIG. 1 is provided as an example. Other examples may differ from what is described with regard to FIG. 1.

Figure 2:
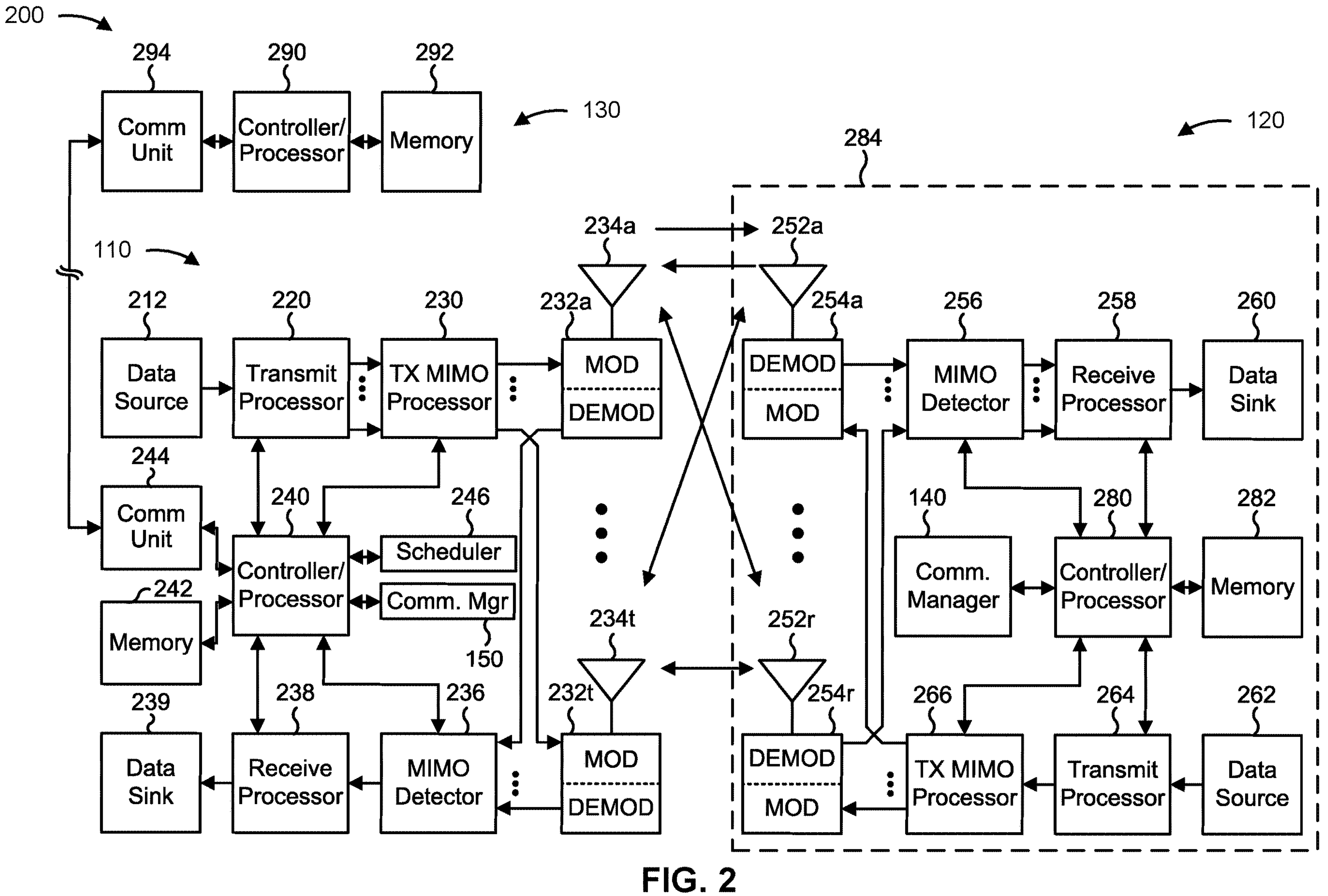
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254_a_ through 254_r_. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234_a_ through 234_t_ and/or antennas 252_a_ through 252_r_) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-13).

The controller/processor 240 of the network node 110, the controller/processor 280 of the UE 120, and/or any other component(s) of FIG. 2 may perform one or more techniques associated with a joint cell activation and timing advance command, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a PCell, an RRC message that indicates a cell set and a measurement configuration; means for transmitting, to the PCell, a measurement report that indicates one or more measurements of one or more cells indicated in the cell set, wherein the one or more measurements are derived based at least in part on the measurement configuration; and/or means for receiving, from the PCell, a joint cell activation and timing advance command MAC-CE, wherein the joint cell activation and timing advance command MAC-CE indicates an activation of a new cell, of the one or more cells, and timing advance information associated with the new cell. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE and via a PCell of the network node, an RRC message that indicates a cell set and a measurement configuration; means for receiving, from the UE, a measurement report that indicates one or more measurements of one or more cells indicated in the cell set, wherein the one or more measurements are derived based at least in part on the measurement configuration; and/or means for transmitting, to the UE and via the PCell, a joint cell activation and timing advance command MAC-CE, wherein the joint cell activation and timing advance command MAC-CE indicates an activation of a new cell, of the one or more cells, and timing advance information associated with the new cell. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
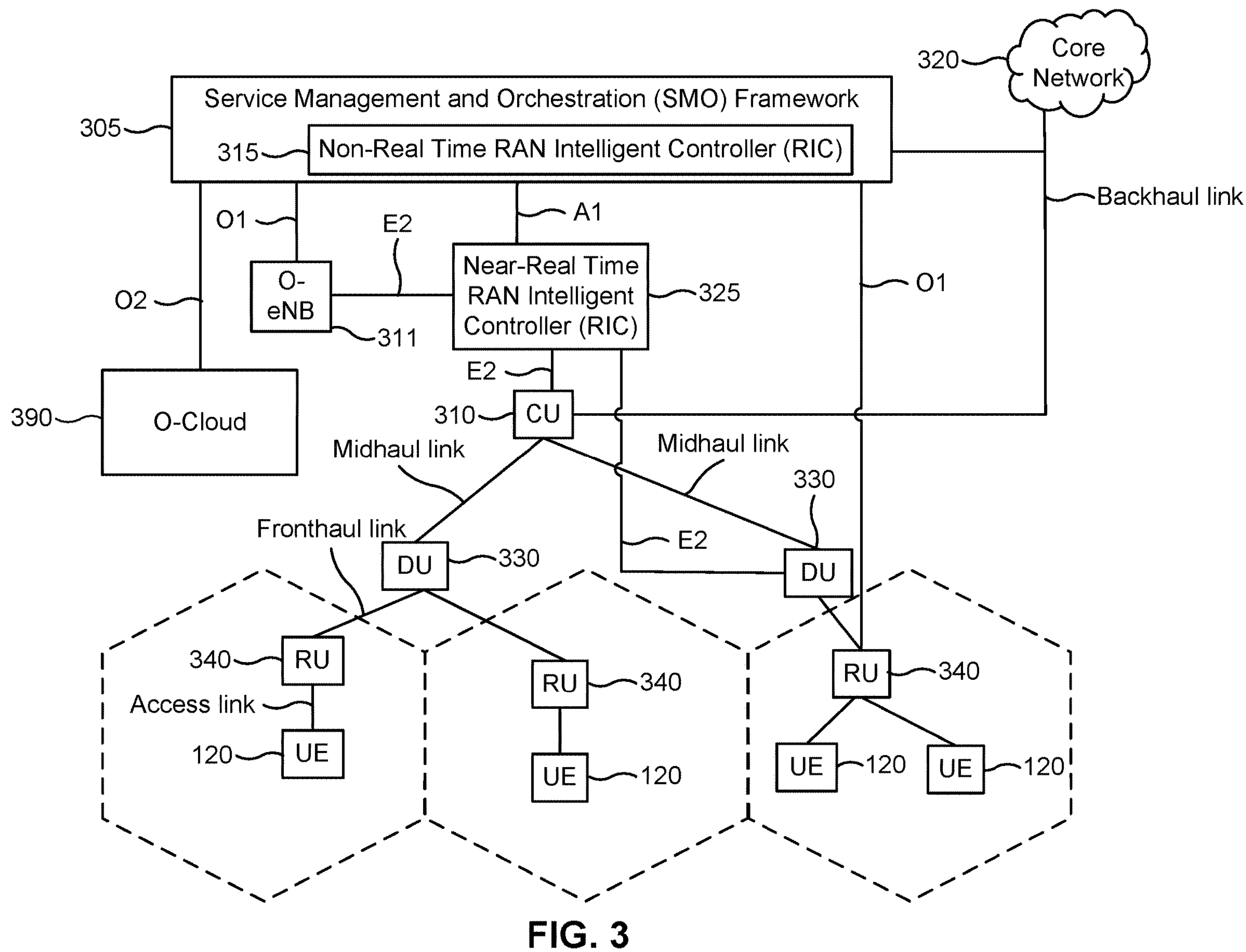
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A UE may connect with a network including a plurality of cells. The UE may use L1 and/or L2 based signaling to perform L1/L2 inter-cell mobility operations among the plurality of cells. An L1/L2 based inter-cell mobility design may involve a configuration and maintenance for multiple candidate cells to allow a fast application of configurations for candidate cells. The L1/L2 based inter-cell mobility design may involve a dynamic switch mechanism among candidate serving cells, which may include a special cell (SpCell) and a secondary cell (SCell), for potential applicable scenarios based at least in part on L1/L2 signaling. The L1/L2 based inter-cell mobility design may involve L1 enhancements for inter-cell beam management, which may include L1 measurement and reporting, and beam indications. The L1/L2 based inter-cell mobility design may involve a timing advance management.

An L1/L2 based inter-cell mobility procedure may be applicable to various scenarios. The L1/L2 based inter-cell mobility procedure may be applicable to standalone, carrier aggregation, and/or NR dual connectivity scenarios with a serving cell change within one configured grant. The L1/L2 based inter-cell mobility procedure may be applicable to an intra-DU scenario or an intra-CU inter-DU scenario (e.g., applicable for standalone and carrier aggregation). The L1/L2 based inter-cell mobility procedure may be applicable to both intra frequencies and inter frequencies. The L1/L2 based inter-cell mobility procedure may be applicable to both FR1 and FR2. The L1/L2 based inter-cell mobility procedure may be applicable when source and target cells are synchronized or not synchronized.

The UE may be configured with a set of cells for L1/L2 based inter-cell mobility, which may be based at least in part on an RRC configuration. A cell in a configured cell set may be considered to be an activated cell or a deactivated cell. The configured cell set may include a PCell and SCells. An activated cell set may refer to a group of cells that are able to be readily used for data and control transfer. A deactivated cell set may refer to a group of cells that are able to be activated using L1/L2 based signaling.

A network node may perform a timing advance group (TAG) assignment. The network node may assign TAG information to different cells based at least in part on cell locations associated with the cells, operating bands, and/or UE locations. Cells that are associated with the same TAG identifier may share the same timing advance information. Mobility within the configured cell set may be based at least in part on L1/L2 based signaling, which may allow for activation/deactivation of cells in the configured cell set.

A timing advance value may be used to control a timing of uplink transmissions by the UE, such that the uplink transmissions may be received by the network node at a time that aligns with an internal timing of the network node. The network node may determine the timing advance value to the UE (e.g., directly or via one or more network nodes) by measuring a time difference between reception of uplink transmissions from the UE and a subframe timing used by the network node (e.g., by determining a difference between when the uplink transmissions were supposed to have been received by the network node, according to the subframe timing, and when the uplink transmissions were actually received). The network node may transmit a timing advance command to instruct the UE to transmit future uplink communications earlier or later to reduce or eliminate the time difference and align timing between the UE and network node. The timing advance command may be used to offset timing differences between the UE and the network node due to different propagation delays that occur when the UE is different distances from the network node. If timing advance commands were not used, then uplink transmissions from different UEs (e.g., located at different distances from the network node) may collide due to mistiming even if the uplink transmissions are scheduled for different subframes.

Figure 4:
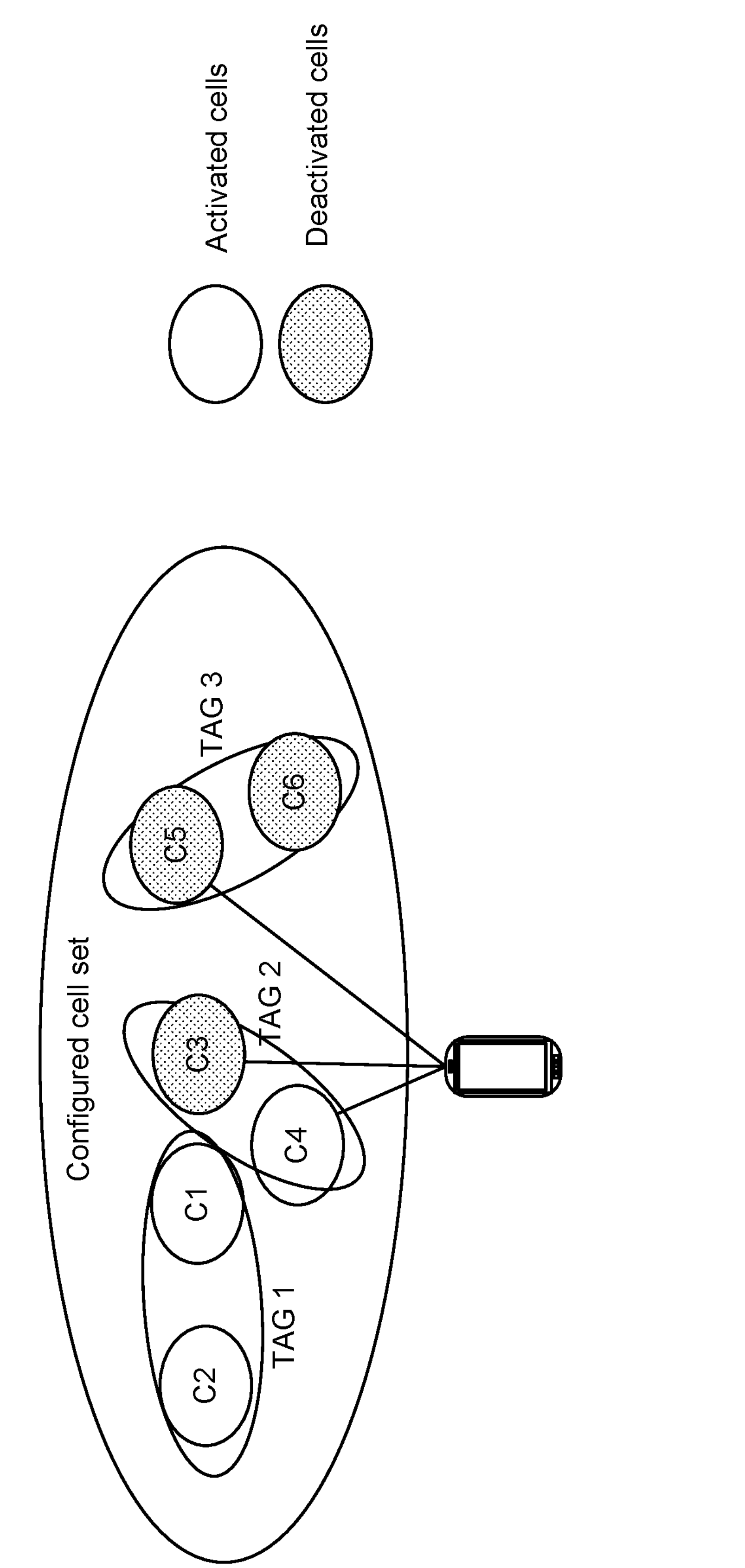
FIG. 4 is a diagram illustrating an example of a configured cell set, in accordance with the present disclosure.

FIG. 4 is a diagram illustrating an example 400 of a configured cell set, in accordance with the present disclosure.

As shown in FIG. 4, the configured cell set may include a plurality of cells, such as a first cell (C1), a second cell (C2), a third cell (C3), a fourth cell (C4), a fifth cell (C5), and a sixth cell (C6). The plurality of cells may include candidate cells for layer 1 (L1) or layer 2 (L2) triggered mobility (LTM). One or more cells of the plurality of cells may be configured to communicate with a UE. A first TAG may be associated with a first group of cells (e.g., C1 and C2) within the plurality of cells. A second TAG may be associated with a second group of cells (e.g., C3 and C4) within the plurality of cells. A third TAG may be associated with a third group of cells (e.g., C5 and C6) within the plurality of cells. Some cells from the plurality of cells may be activated cells, and other cells from the plurality of cells may be deactivated cells. For example, the first cell, the third cell, and the fourth cell may be activated cells, and the second cell, the fifth cell, and the sixth cell may be deactivated cells. The activated cells may be serving cells. The deactivated cells may be serving cells and/or non-serving cells.

As indicated above, FIG. 4 is provided as an example. Other examples may differ from what is described with regard to FIG. 4.

In a legacy carrier aggregation, a timing advance MAC-CE may be separated from an SCell activation/deactivation MAC-CE. In the legacy carrier aggregation, a new SCell may be activated by a cell activation MAC-CE. After the new SCell is activated, a UE may perform a physical downlink control channel (PDCCH)-ordered random access control channel (RACH) procedure on that new SCell to obtain timing advance information for an uplink synchronization.

Figure 5:
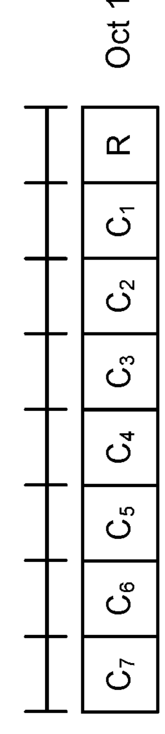
FIG. 5 is a diagram illustrating an example of legacy timing advance and cell activation or deactivation, in accordance with the present disclosure.
Figure 5:
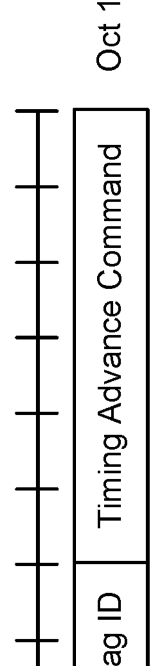

FIG. 5 is a diagram illustrating an example 500 of legacy timing advance and cell activation or deactivation, in accordance with the present disclosure.

As shown by reference number 502, a legacy timing advance MAC-CE may indicate a TAG identifier, which may be two bits, and a timing advance command, which may be six bits. The legacy timing advance MAC-CE may be associated with one octet. As shown by reference number 504, a legacy SCell activation/deactivation MAC-CE may indicate a $C_i$ field, which may be one octet or four octets. A $C_i$ field value of "1" may activate an SCell i. A $C_i$ field value of "0" may deactivate an SCell i.

As indicated above, FIG. 5 is provided as an example. Other examples may differ from what is described with regard to FIG. 5.

For L1/L2 based inter-cell mobility, a fast cell activation/deactivation and timing advance may need to be facilitated. For L1/L2 based inter-cell mobility, a cell may be activated using L1/L2 based signaling. The timing advance may need to be updated at a relatively high rate at a network node based at least in part on a UE measurement report. The timing advance may need to be ready to use at the time of a new cell activation. L1/L2 based inter-cell mobility may necessitate seamless mobility among configured cells, as well as reduced latency and improved system performance.

However, a legacy approach does not support such facilitation of a fast cell activation/deactivation and timing advance. In the legacy approach, a UE may receive, from a network node, an SCell activation/deactivation MAC-CE, which may enable a new SCell to be activated. After the new SCell is activated, the UE may perform a PDCCH-ordered RACH procedure on that new SCell to obtain timing advance information. In other words, only after the new SCell is activated, the UE may receive a timing advance MAC-CE. An amount of time needed for the UE to receive both the SCell activation/deactivation MAC-CE and the timing advance MAC-CE may be relatively long, and thus may be insufficient for L1/L2 based inter-cell mobility.

In various aspects of techniques and apparatuses described herein, a UE may receive, from a serving cell such as a PCell, an RRC message that indicates an L1/L2 inter-cell mobility cell set and a measurement configuration. The cell set and the measurement configuration may be for LTM. The UE may transmit, to the PCell, a measurement report that indicates one or more measurements of one or more cells indicated in the L1/L2 inter-cell mobility cell set. The one or more measurements and reporting may be associated with an L1 type (e.g., beam level). The UE may derive the one or more measurements based at least in part on the measurement configuration. The UE may receive, from the PCell, a joint cell activation and timing advance command MAC-CE, wherein the joint cell activation and timing advance command MAC-CE indicates an activation of a new cell, of the one or more cells, and timing advance information associated with the new cell.

In some aspects, for the L1/L2 inter-cell mobility cell set, the joint cell activation and timing advance command MAC-CE may be employed, such that timing advance information may be jointly signaled with a cell activation command. A timing advance command and a cell activation/deactivation command may be combined into a single MAC-CE, which may eliminate a need for the UE to separately perform a RACH procedure to obtain the timing advance information. The joint cell activation and timing advance command MAC-CE may be associated with a potential latency reduction, a quality of service (QoS) improvement, and/or power consumption savings. The joint cell activation and timing advance command MAC-CE may reduce a signaling redundancy. Further, since a PCell may be activated using L1/L2 based signaling, the joint cell activation and timing advance command MAC-CE may be applied to both SCell and PCell activation. Although in some cases multiple activated cells may belong to the same TAG identifier, in which case duplicated information may occur in octets for the TAG identifier and timing advance command, an overall reduction in signaling overhead and complexity may be achieved.

Figure 6:
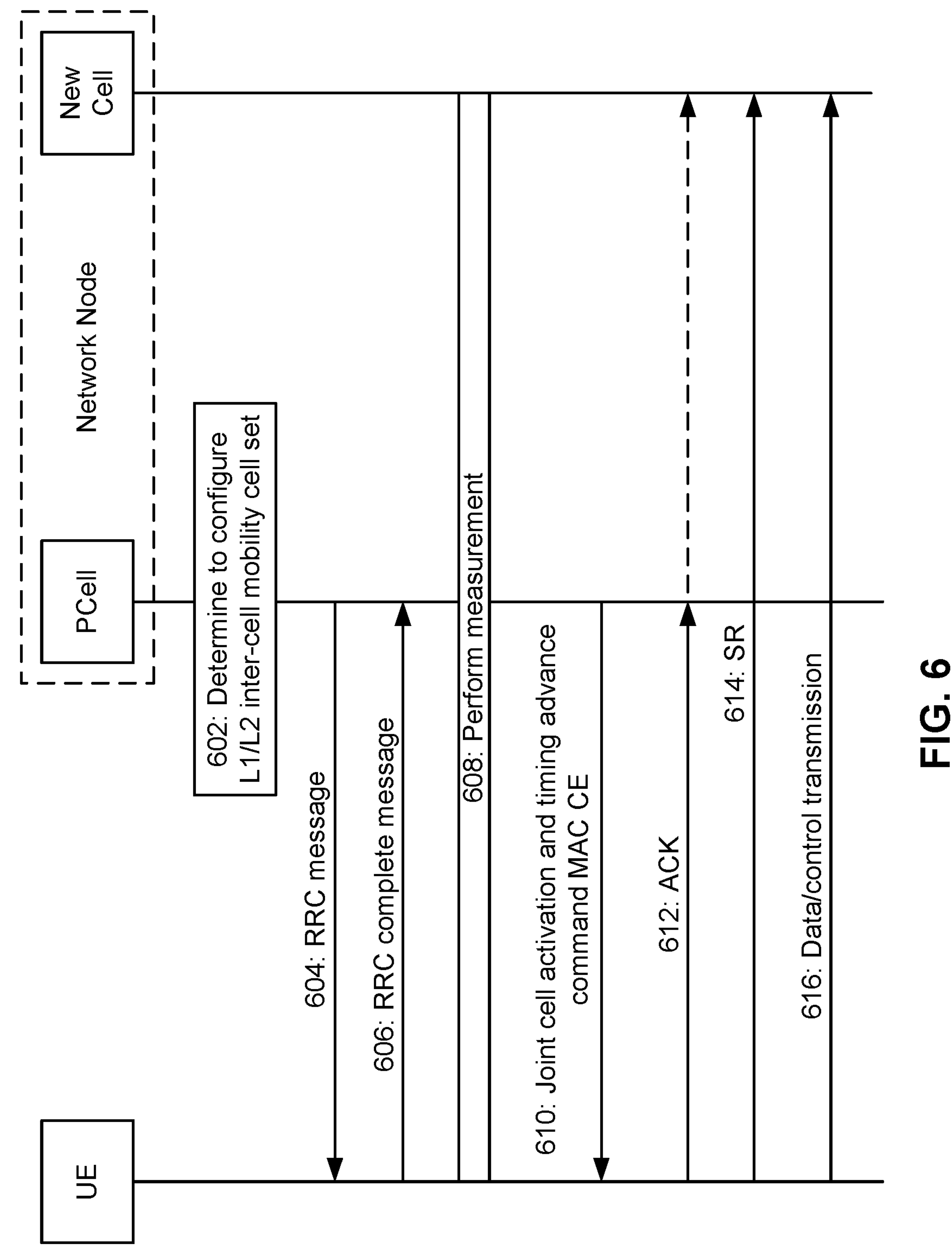

FIG. 6 is a diagram illustrating an example 600 associated with a joint cell activation and timing advance command, in accordance with the present disclosure. As shown in FIG. 6, example 600 includes communication between a UE (e.g., UE 120) and a network node (e.g., network node 110). In some aspects, the UE and the network node may be included in a wireless network, such as wireless network 100.

As shown by reference number 602, a PCell associated with the network node may determine to configure a cell set, such as an L1/L2 inter-cell mobility cell set, for the UE. The cell set may include one or more cells, which may be candidate cells for inter-cell mobility (e.g., a movement of the UE between cells). An L1/L2 inter-cell mobility may correspond to a serving cell change via L1 (e.g., downlink control information (DCI)) and/or L2 (e.g., MAC-CE) signaling. As shown by reference number 604, the PCell may transmit, to the UE, an RRC message. The RRC message may be an RRC configuration message or an RRC reconfiguration message. The RRC message may indicate the L1/L2 inter-cell mobility cell set and a measurement configuration. The cell set and the measurement configuration may be for LTM. The measurement configuration may indicate the one or more cells to be measured by the UE. The RRC message may indicate, to the UE, resources to be used by the UE for receiving a joint cell activation and timing advance command MAC-CE. The RRC message may indicate, to the UE, an option (e.g., an implicit option or an explicit option), to be followed by the UE, for transmitting a confirmation regarding the joint cell activation and timing advance command MAC-CE to the PCell.

In some aspects, the RRC message may configure multiple values for parameters associated with the L1/L2 inter-cell mobility cell set, the resources to be used for receiving the joint cell activation and timing advance command MAC-CE, and/or options for transmitting the confirmation. In this case, the PCell may use a separate MAC-CE or DCI to switch between configurations (or between values for the parameters). In other words, the RRC message may indicate a first value that instructs the UE to transmit an acknowledgement (ACK) to the PCell and/or the new cell in response to a receipt of the joint cell activation and timing advance command MAC-CE, or a second value that instructs the UE to transmit a scheduling request (SR) to the new cell using a timing advance command indicated in the joint cell activation and timing advance command MAC-CE.

As shown by reference number 606, the UE may transmit, to the PCell, an RRC complete message. The RRC complete message may be an RRC configuration complete message or an RRC reconfiguration complete message. The UE may transmit the RRC complete message based at least in part on the RRC message received from the PCell. As shown by reference number 608, the UE may perform measurements of the one or more cells. The UE may perform the measurements of the one or more cells based at least in part on the measurement configuration indicated in the RRC message. The UE may perform the measurements based at least in part on reference signals received from the one or more cells. In some aspects, the UE may transmit, to the PCell, a measurement report that indicates the measurements associated with the one or more cells indicated in the cell set, where the measurements may be derived based at least in part on the measurement configuration. The measurements may be associated with an L1 type (e.g., beam level).

As shown by reference number 610, the UE may receive, from the PCell, the joint cell activation and timing advance command MAC-CE. The joint cell activation and timing advance command MAC-CE may indicate an activation of a new cell, of the one or more cells, and timing advance information associated with the new cell. The timing advance information may indicate a TAG identifier associated with the new cell and a timing advance command associated with the TAG identifier. The timing advance command may be based at least in part on the measurement report that indicates the measurements associated with the one or more cells indicated in the cell set. In other words, the PCell may update the timing advance information based at least in part on the measurement report. The timing advance command may be ready to use by the UE after the activation of the new cell.

In some aspects, the PCell may transmit, to the UE, the joint cell activation and timing advance command MAC-CE. The joint cell activation and timing advance command MAC-CE may serve to activate the new cell (e.g., a new SCell or a new PCell) and to indicate a timing advance associated with the new cell. In other words, the PCell may employ a single MAC-CE to both activate the new cell and indicate the timing advance associated with the new cell, which may eliminate a need for the UE to first perform a RACH procedure with the new cell before obtaining timing advance information associated with the new cell.

As shown by reference number 612, the UE may transmit, to the PCell and/or the new cell, the ACK. The UE may transmit the ACK based at least in part on the joint cell activation and timing advance command MAC-CE received from the PCell. As shown by reference number 614, the UE may transmit the SR to the new cell. The UE may be able to transmit the SR to the new cell because the new cell was activated via the joint cell activation and timing advance command MAC-CE. The UE may transmit the ACK and/or the SR based at least in part on the RRC message received from the PCell. As shown by reference number 616, the UE may transmit data and/or control information to the new cell. The UE may transmit, to the new cell, data or control information using the timing advance command indicated in the joint cell activation and timing advance command MAC-CE.

In some aspects, the UE may transmit, to the new cell, an SR using a timing advance command indicated in the joint cell activation and timing advance command MAC-CE, where a reception of the SR may indicate that the new cell is successfully activated. In some aspects, the UE may transmit, to the PCell and/or the new cell, an ACK for the joint cell activation and timing advance command MAC-CE, where a reception of the ACK may indicate that the new cell is successfully activated.

In some aspects, the UE may provide the confirmation regarding the joint cell activation and timing advance command MAC-CE. The UE may provide the confirmation implicitly. For example, the SR transmitted from the UE to the new cell (e.g., a newly activated cell) using a timing advance signaled via the joint cell activation and timing advance command MAC-CE may indicate a successful new cell addition. Alternatively, the UE may provide the confirmation explicitly. For example, the UE may directly transmit, to the PCell and/or the new cell, the ACK for the joint cell activation and timing advance command MAC-CE. A receipt of the ACK may indicate the successful new cell addition.

As indicated above, FIG. 6 is provided as an example. Other examples may differ from what is described with regard to FIG. 6.

Figure 7:
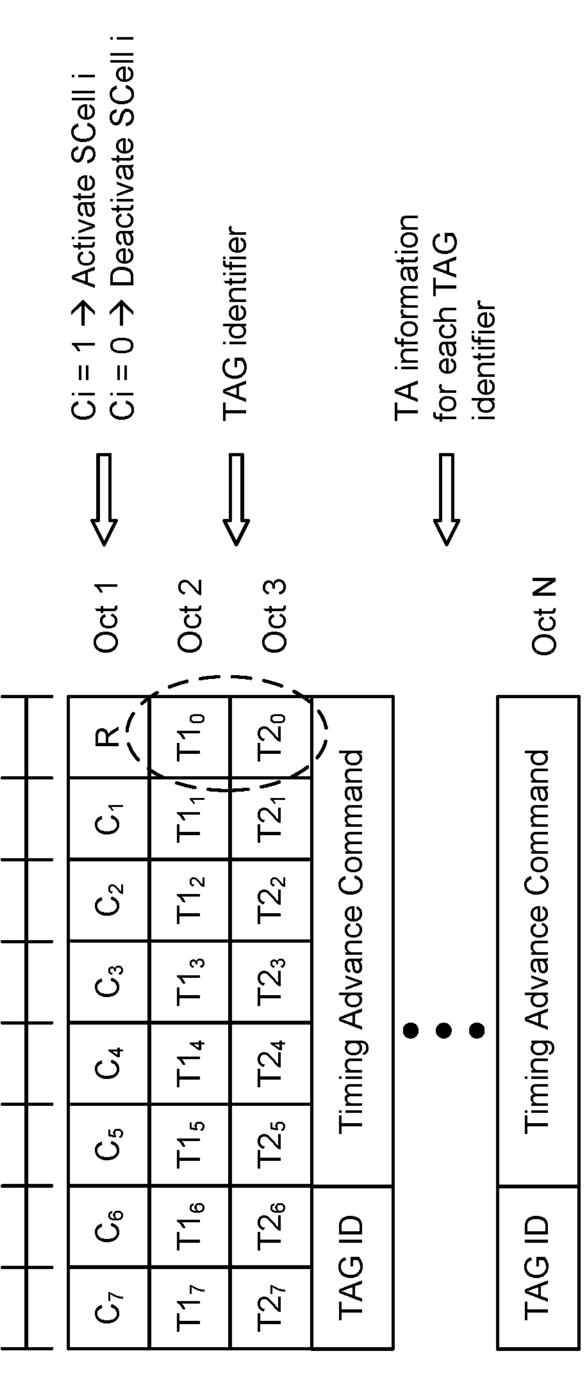

FIG. 7 is a diagram illustrating an example 700 associated with a joint cell activation and timing advance command, in accordance with the present disclosure.

As shown in FIG. 7, a joint cell activation and timing advance command MAC-CE may be up to seven cell activations. A first octet may indicate a $C_i$ field. A $C_i$ field value of "1" may activate an SCell i. A $C_i$ field value of "0" may deactivate an SCell i. A second octet and a third octet may be combination octets. The second octet and the third octet may be used in combination to represent a TAG identifier of an activated cell. The second octet may include one bit and the third octet may include one bit, and these two bits may be used to represent the TAG identifier of the activated cell. For example, $\{T1_i, T2_i)$ may represent two bits of a TAG identifier of activated cells (e.g., cells with $C_i$=1) in an increasing order of cell index. Two octets (e.g., the second octet and the third octet) may be needed for activation of up to seven cells, and up to eight octets may be needed for activation of up to 31 cells. Further, the joint cell activation and timing advance command MAC-CE may include timing advance information for each TAG identifier (e.g., each TAG identifier indicated by the second and third octets). The timing advance information may include, for each TAG identifier, a corresponding timing advance command.

As indicated above, FIG. 7 is provided as an example. Other examples may differ from what is described with regard to FIG. 7.

Figure 8:
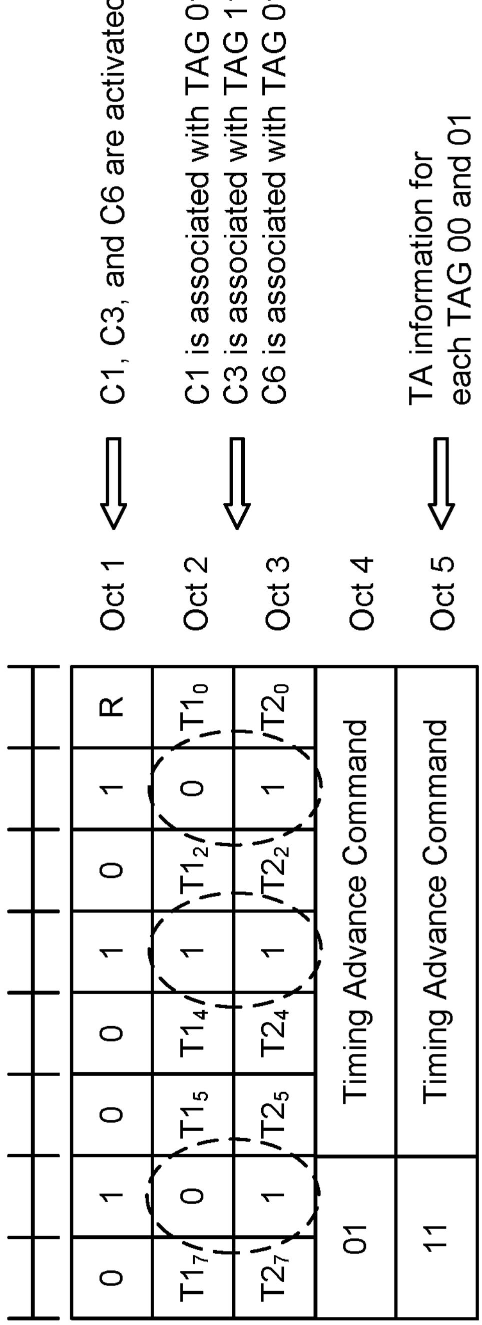

FIG. 8 is a diagram illustrating an example 800 associated with a joint cell activation and timing advance command, in accordance with the present disclosure.

As shown in FIG. 8, a joint cell activation and timing advance command MAC-CE may activate three cells (e.g., C1, C3, and C6). In a first octet of the joint cell activation and timing advance command MAC-CE, a bit may be "1" to indicate a corresponding cell that is activated, or a bit may be "0" to indicate that a corresponding cell is not activated. A second octet and a third octet of the joint cell activation and timing advance command MAC-CE may be used to indicate TAG identifiers associated with each of the three activated cells. For example, one bit of the second octet and one bit of the third octet, which may each be associated with C1, may be combined to form "01", which may indicate that TAG identifier 01 is associated with C1. One bit of the second octet and one bit of the third octet, which may each be associated with C3, may be combined to form "11", which may indicate that TAG identifier 11 is associated with C3. One bit of the second octet and one bit of the third octet, which may each be associated with C6, may be combined to form "01", which may indicate that TAG identifier O1 is associated with C6. Further, the joint cell activation and timing advance command MAC-CE may indicate timing advance information for each of TAG identifier 00 and TAG identifier 01. For example, the joint cell activation and timing advance command MAC-CE may indicate a timing advance command associated with TAG identifier 00, as well as a timing advance command associated with TAG identifier 01.

As indicated above, FIG. 8 is provided as an example. Other examples may differ from what is described with regard to FIG. 8.

FIG. 9 is a diagram illustrating an example 900 associated with a joint cell activation and timing advance command, in accordance with the present disclosure.

As shown in FIG. 9, a joint cell activation and timing advance command MAC-CE may be up to 31 cell activations. Four octets may be used to indicate a $C_i$ field (e.g., $C_1$ to $C_{31}$). A $C_i$ field value of "1" may activate an SCell i. A $C_i$ field value of "0" may deactivate an SCell i. Pairs of octets may be used in combination to represent a TAG identifier of an activated cell. For example, a fifth octet and a sixth octet may be used in combination to represent TAG identifiers of up to seven activated cells, a seventh octet and an eighth octet may be used in combination to represent TAG identifiers of up to another seven activated cells, and so on. Further, the joint cell activation and timing advance command MAC-CE may include timing advance information for each TAG identifier. The timing advance information may include, for each TAG identifier, a corresponding timing advance command.

As indicated above, FIG. 9 is provided as an example. Other examples may differ from what is described with regard to FIG. 9.

Figure 10:
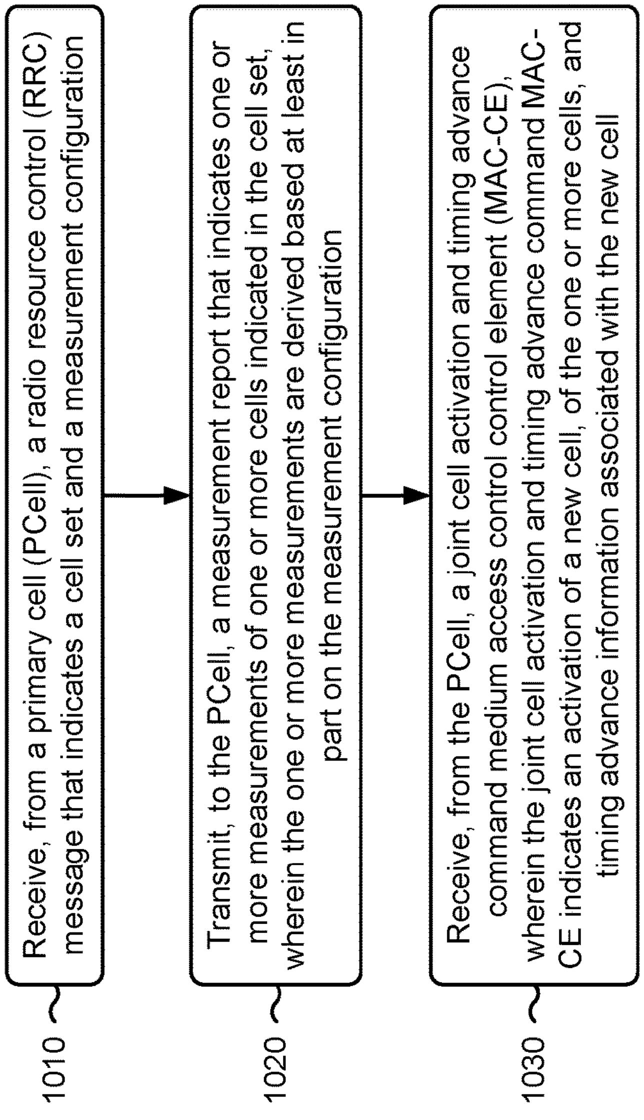
FIGS. 10-11 are diagrams illustrating example processes associated with a joint cell activation and timing advance command, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a joint cell activation and timing advance command.

As shown in FIG. 10, in some aspects, process 1000 may include receiving, from a PCell, an RRC message that indicates a cell set and a measurement configuration (block 1010). For example, the UE (e.g., using communication manager 140 and/or reception component 1202, depicted in FIG. 12) may receive, from a PCell, an RRC message that indicates a cell set and a measurement configuration, as described above.

As further shown in FIG. 10, in some aspects, process 1000 may include transmitting, to the PCell, a measurement report that indicates one or more measurements of one or more cells indicated in the cell set, wherein the one or more measurements are derived based at least in part on the measurement configuration (block 1020). For example, the UE (e.g., using communication manager 140 and/or transmission component 1204, depicted in FIG. 12) may transmit, to the PCell, a measurement report that indicates one or more measurements of one or more cells indicated in the cell set, wherein the one or more measurements are derived based at least in part on the measurement configuration, as described above.

As further shown in FIG. 10, in some aspects, process 1000 may include receiving, from the PCell, a joint cell activation and timing advance command MAC-CE, wherein the joint cell activation and timing advance command MAC-CE indicates an activation of a new cell, of the one or more cells, and timing advance information associated with the new cell (block 1030). For example, the UE (e.g., using communication manager 140 and/or reception component 1202, depicted in FIG. 12) may receive, from the PCell, a joint cell activation and timing advance command MAC-CE, wherein the joint cell activation and timing advance command MAC-CE indicates an activation of a new cell, of the one or more cells, and timing advance information associated with the new cell, as described above.

Process 1000 may include additional aspects, such as any single aspect or any combination of aspects described below and/or in connection with one or more other processes described elsewhere herein.

In a first aspect, process 1000 includes transmitting, to the PCell, an RRC complete message based at least in part on the RRC message received from the PCell.

In a second aspect, alone or in combination with the first aspect, process 1000 includes performing the one or more measurements of the one or more cells based at least in part on the measurement configuration indicated in the RRC message.

In a third aspect, alone or in combination with one or more of the first and second aspects, the joint cell activation and timing advance command MAC-CE is a single MAC-CE that indicates both the activation of the new cell and the timing advance information associated with the new cell.

In a fourth aspect, alone or in combination with one or more of the first through third aspects, the timing advance information includes a TAG identifier associated with the new cell and a timing advance command associated with the TAG identifier.

In a fifth aspect, alone or in combination with one or more of the first through fourth aspects, process 1000 includes transmitting, to the new cell, an SR using a timing advance command indicated in the joint cell activation and timing advance command MAC-CE, wherein a reception of the SR indicates that the new cell is successfully activated.

In a sixth aspect, alone or in combination with one or more of the first through fifth aspects, process 1000 includes transmitting, to one or more of the PCell or the new cell, an ACK for the joint cell activation and timing advance command MAC-CE, wherein a reception of the ACK indicates that the new cell is successfully activated.

In a seventh aspect, alone or in combination with one or more of the first through sixth aspects, process 1000 includes transmitting, to the new cell, data or control information using a timing advance command indicated in the joint cell activation and timing advance command MAC-CE.

In an eighth aspect, alone or in combination with one or more of the first through seventh aspects, the new cell is a new PCell or a new SCell.

In a ninth aspect, alone or in combination with one or more of the first through eighth aspects, the RRC message indicates resources for receiving the joint cell activation and timing advance command MAC-CE.

In a tenth aspect, alone or in combination with one or more of the first through ninth aspects, the RRC message indicates a first value that instructs the UE to transmit an ACK to one or more of the PCell or the new cell in response to a receipt of the joint cell activation and timing advance command MAC-CE, or a second value that instructs the UE to transmit an SR to the new cell using a timing advance command indicated in the joint cell activation and timing advance command MAC-CE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
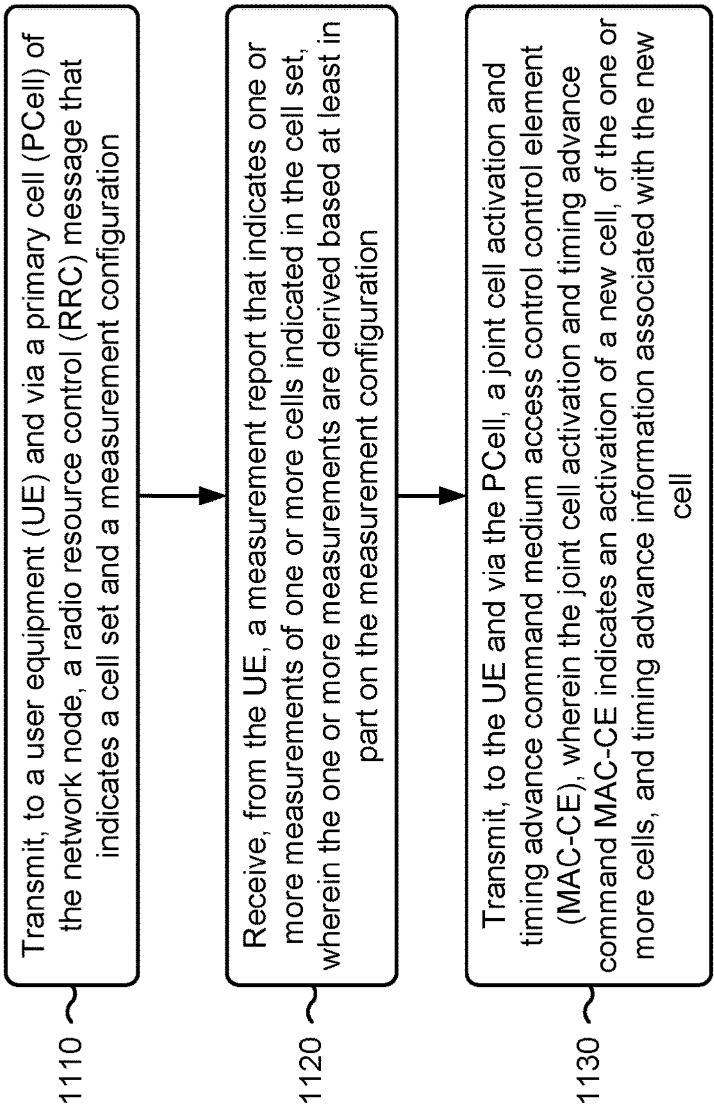

FIG. 11 is a diagram illustrating an example process 1100 performed, for example, by a network node, in accordance with the present disclosure. Example process 1100 is an example where the network node (e.g., network node 110) performs operations associated with a joint cell activation and timing advance command.

As shown in FIG. 11, in some aspects, process 1100 may include transmitting, to a UE and via a PCell of the network node, an RRC message that indicates a cell set and a measurement configuration (block 1110). For example, the network node (e.g., using transmission component 1304, depicted in FIG. 13) may transmit, to a UE and via a PCell of the network node, an RRC message that indicates a cell set and a measurement configuration, as described above.

As further shown in FIG. 11, in some aspects, process 1100 may include receiving, from the UE, a measurement report that indicates one or more measurements of one or more cells indicated in the cell set, wherein the one or more measurements are derived based at least in part on the measurement configuration (block 1120). For example, the network node (e.g., using reception component 1302, depicted in FIG. 13) may receive, from the UE, a measurement report that indicates one or more measurements of one or more cells indicated in the cell set, wherein the one or more measurements are derived based at least in part on the measurement configuration, as described above.

As further shown in FIG. 11, in some aspects, process 1100 may include transmitting, to the UE and via the PCell, a joint cell activation and timing advance command MAC-CE, wherein the joint cell activation and timing advance command MAC-CE indicates an activation of a new cell, of the one or more cells, and timing advance information associated with the new cell (block 1130). For example, the network node (e.g., using transmission component 1304, depicted in FIG. 13) may transmit, to the UE and via the PCell, a joint cell activation and timing advance command MAC-CE, wherein the joint cell activation and timing advance command MAC-CE indicates an activation of a new cell, of the one or more cells, and timing advance information associated with the new cell, as described above.

Process 1100 may include additional aspects, such as any single aspect or any combination of aspects described below and/or in connection with one or more other processes described elsewhere herein.

In a first aspect, the joint cell activation and timing advance command MAC-CE is a single MAC-CE that indicates both the activation of the new cell and the timing advance information associated with the new cell, wherein the timing advance information includes a TAG identifier associated with the new cell and a timing advance command associated with the TAG identifier.

In a second aspect, alone or in combination with the first aspect, process 1100 includes receiving, from the UE and via the PCell, an ACK for the joint cell activation and timing advance command MAC-CE, wherein a reception of the ACK indicates that the new cell is successfully activated.

In a third aspect, alone or in combination with one or more of the first and second aspects, the RRC message indicates resources for the UE to receive the joint cell activation and timing advance command MAC-CE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
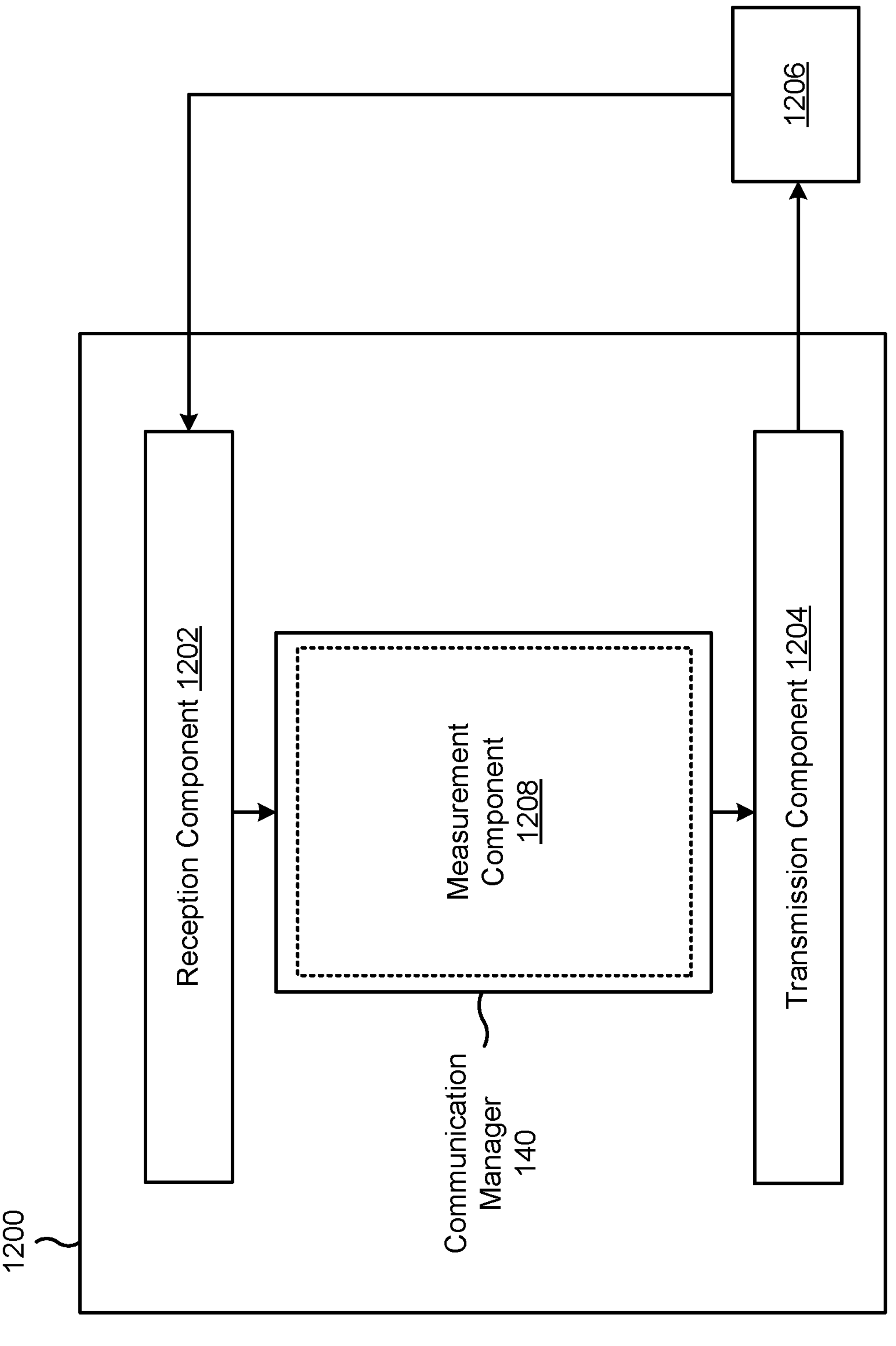
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a measurement component 1208, among other examples.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a PCell, an RRC message that indicates a cell set and a measurement configuration. The transmission component 1204 may transmit, to the PCell, a measurement report that indicates one or more measurements of one or more cells indicated in the cell set, wherein the one or more measurements are derived based at least in part on the measurement configuration. The reception component 1202 may receive, from the PCell, a joint cell activation and timing advance command MAC-CE, wherein the joint cell activation and timing advance command MAC-CE indicates an activation of a new cell, of the one or more cells, and timing advance information associated with the new cell.

The transmission component 1204 may transmit, to the PCell, an RRC complete message based at least in part on the RRC message received from the PCell. The measurement component 1208 may perform the one or more measurements of the one or more cells based at least in part on the measurement configuration indicated in the RRC message. The transmission component 1204 may transmit, to the new cell, an SR using a timing advance command indicated in the joint cell activation and timing advance command MAC-CE, wherein a reception of the SR indicates that the new cell is successfully activated. The transmission component 1204 may transmit, to one or more of the PCell or the new cell, an ACK for the joint cell activation and timing advance command MAC-CE, wherein a reception of the ACK indicates that the new cell is successfully activated. The transmission component 1204 may transmit, to the new cell, data or control information using a timing advance command indicated in the joint cell activation and timing advance command MAC-CE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
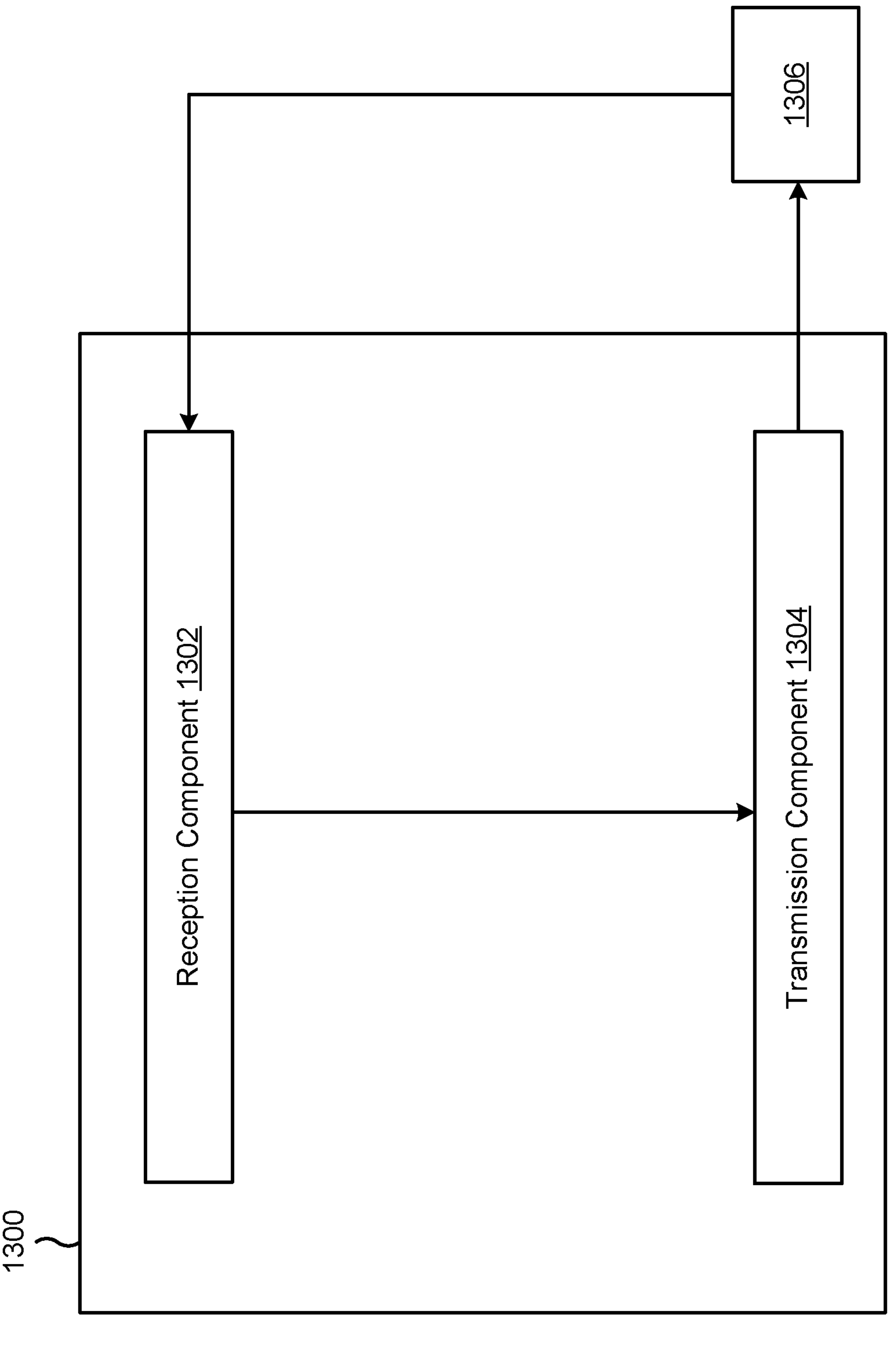

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit, to a UE and via a PCell of the network node, an RRC message that indicates a cell set and a measurement configuration. The reception component 1302 may receive, from the UE, a measurement report that indicates one or more measurements of one or more cells indicated in the cell set, wherein the one or more measurements are derived based at least in part on the measurement configuration. The transmission component 1304 may transmit, to the UE and via the PCell, a joint cell activation and timing advance command MAC-CE, wherein the joint cell activation and timing advance command MAC-CE indicates an activation of a new cell, of the one or more cells, and timing advance information associated with the new cell. The reception component 1302 may receive, from the UE and via the PCell, an ACK for the joint cell activation and timing advance command MAC-CE, wherein a reception of the ACK indicates that the new cell is successfully activated.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an apparatus of a user equipment (UE), comprising: receiving, from a primary cell (PCell), a radio resource control (RRC) message that indicates a cell set and a measurement configuration; transmitting, to the PCell, a measurement report that indicates one or more measurements of one or more cells indicated in the cell set, wherein the one or more measurements are derived based at least in part on the measurement configuration; and receiving, from the PCell, a joint cell activation and timing advance command medium access control control element (MAC-CE), wherein the joint cell activation and timing advance command MAC-CE indicates an activation of a new cell, of the one or more cells, and timing advance information associated with the new cell.

Aspect 2: The method of Aspect 1, further comprising: transmitting, to the PCell, an RRC complete message based at least in part on the RRC message received from the PCell.

Aspect 3: The method of any of Aspects 1 through 2, further comprising: performing the one or more measurements of the one or more cells based at least in part on the measurement configuration indicated in the RRC message.

Aspect 4: The method of any of Aspects 1 through 3, wherein the joint cell activation and timing advance command MAC-CE is a single MAC-CE that indicates both the activation of the new cell and the timing advance information associated with the new cell.

Aspect 5: The method of any of Aspects 1 through 4, wherein the timing advance information includes a timing advance group (TAG) identifier associated with the new cell and a timing advance command associated with the TAG identifier.

Aspect 6: The method of any of Aspects 1 through 5, further comprising: transmitting, to the new cell, a scheduling request (SR) using a timing advance command indicated in the joint cell activation and timing advance command MAC-CE, wherein a reception of the SR indicates that the new cell is successfully activated.

Aspect 7: The method of any of Aspects 1 through 6, further comprising: transmitting, to one or more of the PCell or the new cell, an acknowledgement (ACK) for the joint cell activation and timing advance command MAC-CE, wherein a reception of the ACK indicates that the new cell is successfully activated.

Aspect 8: The method of any of Aspects 1 through 7, further comprising: transmitting, to the new cell, data or control information using a timing advance command indicated in the joint cell activation and timing advance command MAC-CE.

Aspect 9: The method of any of Aspects 1 through 8, wherein the new cell is a new PCell or a new secondary cell.

Aspect 10: The method of any of Aspects 1 through 9, wherein the RRC message indicates resources for receiving the joint cell activation and timing advance command MAC-CE.

Aspect 11: The method of any of Aspects 1 through 10, wherein the RRC message indicates a first value that instructs the UE to transmit an acknowledgement to one or more of the PCell or the new cell in response to a receipt of the joint cell activation and timing advance command MAC-CE, or a second value that instructs the UE to transmit a scheduling request to the new cell using a timing advance command indicated in the joint cell activation and timing advance command MAC-CE.

Aspect 12: A method of wireless communication performed by an apparatus of a network node, comprising: transmitting, to a user equipment (UE) and via a primary cell (PCell) of the network node, a radio resource control (RRC) message that indicates a cell set and a measurement configuration; receiving, from the UE, a measurement report that indicates one or more measurements of one or more cells indicated in the cell set, wherein the one or more measurements are derived based at least in part on the measurement configuration; and transmitting, to the UE and via the PCell, a joint cell activation and timing advance command medium access control control element (MAC-CE), wherein the joint cell activation and timing advance command MAC-CE indicates an activation of a new cell, of the one or more cells, and timing advance information associated with the new cell.

Aspect 13: The method of Aspect 12, wherein the joint cell activation and timing advance command MAC-CE is a single MAC-CE that indicates both the activation of the new cell and the timing advance information associated with the new cell, wherein the timing advance information includes a timing advance group (TAG) identifier associated with the new cell and a timing advance command associated with the TAG identifier.

Aspect 14: The method of any of Aspects 12 through 13, further comprising: receiving, from the UE and via the PCell, an acknowledgement (ACK) for the joint cell activation and timing advance command MAC-CE, wherein a reception of the ACK indicates that the new cell is successfully activated.

Aspect 15: The method of any of Aspects 12 through 14, wherein the RRC message indicates resources for the UE to receive the joint cell activation and timing advance command MAC-CE.

Aspect 16: An apparatus for wireless communication at a device, comprising a processor; memory coupled with the processor; and instructions stored in the memory and executable by the processor to cause the apparatus to perform the method of one or more of Aspects 1-11.

Aspect 17: A device for wireless communication, comprising a memory and one or more processors coupled to the memory, the one or more processors configured to perform the method of one or more of Aspects 1-11.

Aspect 18: An apparatus for wireless communication, comprising at least one means for performing the method of one or more of Aspects 1-11.

Aspect 19: A non-transitory computer-readable medium storing code for wireless communication, the code comprising instructions executable by a processor to perform the method of one or more of Aspects 1-11.

Aspect 20: A non-transitory computer-readable medium storing a set of instructions for wireless communication, the set of instructions comprising one or more instructions that, when executed by one or more processors of a device, cause the device to perform the method of one or more of Aspects 1-11.

Aspect 21: An apparatus for wireless communication at a device, comprising a processor; memory coupled with the processor; and instructions stored in the memory and executable by the processor to cause the apparatus to perform the method of one or more of Aspects 12-15.

Aspect 22: A device for wireless communication, comprising a memory and one or more processors coupled to the memory, the one or more processors configured to perform the method of one or more of Aspects 12-15.

Aspect 23: An apparatus for wireless communication, comprising at least one means for performing the method of one or more of Aspects 12-15.

Aspect 24: A non-transitory computer-readable medium storing code for wireless communication, the code comprising instructions executable by a processor to perform the method of one or more of Aspects 12-15.

Aspect 25: A non-transitory computer-readable medium storing a set of instructions for wireless communication, the set of instructions comprising one or more instructions that, when executed by one or more processors of a device, cause the device to perform the method of one or more of Aspects 12-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors coupled to the one or more memories, the one or more processors individually or collectively configured to:

receive, from a primary cell (PCell), a radio resource control (RRC) message that indicates an L1/L2 inter-cell mobility cell set and a measurement configuration associated with the L1/L2 inter-cell mobility cell set;

transmit, to the PCell, a measurement report that indicates one or more measurements of one or more cells indicated in the cell set, wherein the one or more measurements are derived based at least in part on the measurement configuration; and receive, from the PCell, a joint cell activation and timing advance command medium access control control element (MAC-CE), wherein the joint cell activation and timing advance command MAC-CE indicates an activation of a new cell, of the one or more cells, and timing advance information associated with the new cell.

2. The apparatus of claim 1, wherein the one or more processors are further individually or collectively configured to:

transmit, to the PCell, an RRC complete message based at least in part on the RRC message received from the PCell.

3. The apparatus of claim 1, wherein the one or more processors are further individually or collectively configured to:

perform the one or more measurements of the one or more cells based at least in part on the measurement configuration indicated in the RRC message.

4. The apparatus of claim 1, wherein the joint cell activation and timing advance command MAC-CE is a single MAC-CE that indicates both the activation of the new cell and the timing advance information associated with the new cell.

5. The apparatus of claim 1, wherein the timing advance information includes a timing advance group (TAG) identifier associated with the new cell and a timing advance command associated with the TAG identifier.

6. The apparatus of claim 1, wherein the one or more processors are further individually or collectively configured to:

transmit, to the new cell, a scheduling request (SR) using a timing advance command indicated in the joint cell activation and timing advance command MAC-CE, wherein a reception of the SR indicates that the new cell is successfully activated.

7. The apparatus of claim 1, wherein the one or more processors are further individually or collectively configured to:

transmit, to one or more of the PCell or the new cell, an acknowledgement (ACK) for the joint cell activation and timing advance command MAC-CE, wherein a reception of the ACK indicates that the new cell is successfully activated.

8. The apparatus of claim 1, wherein the one or more processors are further individually or collectively configured to:

transmit, to the new cell, data or control information using a timing advance command indicated in the joint cell activation and timing advance command MAC-CE.

9. The apparatus of claim 1, wherein the new cell is a new PCell or a new secondary cell.

10. The apparatus of claim 1, wherein the RRC message indicates resources for receiving the joint cell activation and timing advance command MAC-CE.

11. The apparatus of claim 1, wherein the RRC message indicates a first value that instructs the UE to transmit an acknowledgement to one or more of the PCell or the new cell in response to a receipt of the joint cell activation and timing advance command MAC-CE, or a second value that instructs the UE to transmit a scheduling request to the new cell using a timing advance command indicated in the joint cell activation and timing advance command MAC-CE.

12. An apparatus for wireless communication at a network node, comprising:

one or more memories; and one or more processors coupled to the one or more memories, the one or more processors individually or collectively configured to:

transmit, to a user equipment (UE) and via a primary cell (PCell) of the network node, a radio resource control (RRC) message that indicates an L1/L2 inter-cell mobility cell set and a measurement configuration associated with the L1/L2 inter-cell mobility cell set;

receive, from the UE, a measurement report that indicates one or more measurements of one or more cells indicated in the cell set, wherein the one or more measurements are derived based at least in part on the measurement configuration; and transmit, to the UE and via the PCell, a joint cell activation and timing advance command medium access control control element (MAC-CE), wherein the joint cell activation and timing advance command MAC-CE indicates an activation of a new cell, of the one or more cells, and timing advance information associated with the new cell.

13. The apparatus of claim 12, wherein the joint cell activation and timing advance command MAC-CE is a single MAC-CE that indicates both the activation of the new cell and the timing advance information associated with the new cell, wherein the timing advance information includes a timing advance group (TAG) identifier associated with the new cell and a timing advance command associated with the TAG identifier.

14. The apparatus of claim 12, wherein the one or more processors are further individually or collectively configured to:

receive, from the UE and via the PCell, an acknowledgement (ACK) for the joint cell activation and timing advance command MAC-CE, wherein a reception of the ACK indicates that the new cell is successfully activated.

15. The apparatus of claim 12, wherein the RRC message indicates resources for the UE to receive the joint cell activation and timing advance command MAC-CE.

16. A method of wireless communication performed by an apparatus of a user equipment (UE), comprising:

receiving, from a primary cell (PCell), a radio resource control (RRC) message that indicates an L1/L2 inter-cell mobility cell set and a measurement configuration associated with the L1/L2 inter-cell mobility cell set;

transmitting, to the PCell, a measurement report that indicates one or more measurements of one or more cells indicated in the cell set, wherein the one or more measurements are derived based at least in part on the measurement configuration; and receiving, from the PCell, a joint cell activation and timing advance command medium access control control element (MAC-CE), wherein the joint cell activation and timing advance command MAC-CE indicates an activation of a new cell, of the one or more cells, and timing advance information associated with the new cell.

17. The method of claim 16, further comprising:

transmitting, to the PCell, an RRC complete message based at least in part on the RRC message received from the PCell.

18. The method of claim 16, further comprising:

performing the one or more measurements of the one or more cells based at least in part on the measurement configuration indicated in the RRC message.

19. The method of claim 16, wherein the joint cell activation and timing advance command MAC-CE is a single MAC-CE that indicates both the activation of the new cell and the timing advance information associated with the new cell.

20. The method of claim 16, wherein the timing advance information includes a timing advance group (TAG) identifier associated with the new cell and a timing advance command associated with the TAG identifier.

21. The method of claim 16, further comprising:

transmitting, to the new cell, a scheduling request (SR) using a timing advance command indicated in the joint cell activation and timing advance command MAC-CE, wherein a reception of the SR indicates that the new cell is successfully activated.

22. The method of claim 16, further comprising:

transmitting, to one or more of the PCell or the new cell, an acknowledgement (ACK) for the joint cell activation and timing advance command MAC-CE, wherein a reception of the ACK indicates that the new cell is successfully activated.

23. The method of claim 16, further comprising:

transmitting, to the new cell, data or control information using a timing advance command indicated in the joint cell activation and timing advance command MAC-CE.

24. The method of claim 16, wherein the new cell is a new PCell or a new secondary cell.

25. The method of claim 16, wherein the RRC message indicates resources for receiving the joint cell activation and timing advance command MAC-CE.

26. The method of claim 16, wherein the RRC message indicates a first value that instructs the UE to transmit an acknowledgement to one or more of the PCell or the new cell in response to a receipt of the joint cell activation and timing advance command MAC-CE, or a second value that instructs the UE to transmit a scheduling request to the new cell using a timing advance command indicated in the joint cell activation and timing advance command MAC-CE.

27. A method of wireless communication performed by an apparatus of a network node, comprising:

transmitting, to a user equipment (UE) and via a primary cell (PCell) of the network node, a radio resource control (RRC) message that indicates an L1/L2 inter-cell mobility cell set and a measurement configuration associated with the L1/L2 inter-cell mobility cell set;

receiving, from the UE, a measurement report that indicates one or more measurements of one or more cells indicated in the cell set, wherein the one or more measurements are derived based at least in part on the measurement configuration; and transmitting, to the UE and via the PCell, a joint cell activation and timing advance command medium access control control element (MAC-CE), wherein the joint cell activation and timing advance command MAC-CE indicates an activation of a new cell, of the one or more cells, and timing advance information associated with the new cell.

28. The method of claim 27, wherein the joint cell activation and timing advance command MAC-CE is a single MAC-CE that indicates both the activation of the new cell and the timing advance information associated with the new cell, wherein the timing advance information includes a timing advance group (TAG) identifier associated with the new cell and a timing advance command associated with the TAG identifier.

29. The method of claim 27, further comprising:

receiving, from the UE and via the PCell, an acknowledgement (ACK) for the joint cell activation and timing advance command MAC-CE, wherein a reception of the ACK indicates that the new cell is successfully activated.

30. The method of claim 27, wherein the RRC message indicates resources for the UE to receive the joint cell activation and timing advance command MAC-CE.

* * * * *